(12) United States Patent
Guan (10) Patent No.: US 11,307,948 B2
(45) Date of Patent: Apr. 19, 2022

(54) FAULT INJECTION METHOD AND APPARATUS, ELECTRONIC DEVICE AND STORAGE MEDIUM

(71) Applicant: Beijing Baidu Netcom Science and Technology Co., Ltd., Beijing (CN)

(72) Inventor: Yu Guan, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/124,086

(22) Filed: Dec. 16, 2020

(65) Prior Publication Data

US 2021/0374025 A1 Dec. 2, 2021

(30) Foreign Application Priority Data

May 29, 2020 (CN) .......................... 202010479965.9

(51) Int. Cl.
*G06F 11/263* (2006.01)

(52) U.S. Cl.
CPC ................... *G06F 11/263* (2013.01)

(58) Field of Classification Search
CPC ........................... G06F 11/263; G06F 11/3644
See application file for complete search history.

(56) References Cited

U.S. PATENT DOCUMENTS

| 10,986,013 | B1 * | 4/2021 | Theimer | H04L 41/5038 |
| 2006/0271825 | A1 * | 11/2006 | Keaffaber | G06F 11/3688 |
| | | | | 714/E11.207 |
| 2015/0161025 | A1 * | 6/2015 | Baset | G06F 11/2028 |
| | | | | 714/38.1 |
| 2015/0212923 | A1 * | 7/2015 | Sugiyama | G06F 11/3644 |
| | | | | 714/38.1 |
| 2016/0371134 | A1 * | 12/2016 | Raghavendra | G06F 11/3055 |
| 2017/0024299 | A1 * | 1/2017 | Deng | G06F 11/3414 |

(Continued)

FOREIGN PATENT DOCUMENTS

| CN | 105868097 | 8/2016 |
| CN | 106598860 | 4/2017 |

OTHER PUBLICATIONS

Ziade, Haissam, Rafic A. Ayoubi, and Raoul Velazco. "A survey on fault injection techniques." Int. Arab J. Inf. Technol. 1.2 (2004): 171-186. (Year: 2004).*

(Continued)

*Primary Examiner* — Matthew M Kim
*Assistant Examiner* — Indranil Chowdhury
(74) *Attorney, Agent, or Firm* — William C. Schrot; Jeffrey I. Auerbach; AuerbachSchrot LLC (57) ABSTRACT

A fault injection method and apparatus, an electronic device and a storage medium are provided, which are related to the technical fields of computers and cloud computing, in particular to the field of testing. The fault injection method includes: acquiring a fault injection task, which includes at least one target service identification and a fault scenario corresponding to the target service identification; determining a target service according to each target service identification, and acquiring a state of the target service; and injecting the fault scenario corresponding to the target service identification into the target service in a case that the state of the target service is a normal state. The application is beneficial to reduction of labor cost.

15 Claims, 10 Drawing Sheets

(56) References Cited

U.S. PATENT DOCUMENTS

2017/0242784 A1* 8/2017 Heorhiadi .......... G06F 11/3688
2018/0285239 A1 10/2018 Papak et al.
2020/0285571 A1* 9/2020 Mohan ................ G06F 11/3692

OTHER PUBLICATIONS

A. Ceccarelli, T. Zoppi, A. Bondavalli, F. Duchi and G. Vella, "A Testbed for Evaluating Anomaly Detection Monitors through Fault Injection," 2014 IEEE 17th International Symposium on Object/Component/Service-Oriented Real-Time Distributed Computing, 2014, pp. 358-365 (Year: 2014).*

D. Cotroneo, L. De Simone, P. Liguori and R. Natella, "Fault Injection Analytics: A Novel Approach to Discover Failure Modes in Cloud-Computing Systems," IEEE Transactions on Dependable and Secure Computing, Sep. 2020 (Year: 2020).*

Extended European Search Report EP 20215705.3 (dated May 11, 2021) (10 pages).

Yin, K., et al. (2019) "*On Representing and Eliciting Resilience Requirements of Microservice Architecture Systems,*" arxiv.org, Cornell University Library, xpo81484656.

* cited by examiner

| Action Name | Please enter | | |
|---|---|---|---|
| Collection Time: | Please enter | | |
| Check Interval: | Please enter | Retry Count | Please enter |
| Index Range: | ☐—☐ | Collection Mode: | Please enter |

Save

FIG. 4

| Action Name: | Please enter the action name | Query | | | | Add Action |
|---|---|---|---|---|---|---|
| Action | Tag | Type | Affect | Level | Latest Version | Operations |
| Console Access Failure Check | Custom | Check | High | 1 | | Rename \| View \| Added Version |
| MEN Full | System | Fault Injection | Low | 1 | | Rename \| View \| Added Version |
| NETWORK Packet Loss | System | Fault Injection | Low | 1 | | Rename \| View \| Added Version |
| MACHINE Time Tamper | System | Fault Injection | Low | 3 | | Rename \| View \| Added Version |
| Official Network Forbidden Port | Custom | Fault Injection | Low | 3 | | Rename \| View \| Added Version |

FAULT INJECTION METHOD AND APPARATUS, ELECTRONIC DEVICE AND STORAGE MEDIUM

CROSS-REFERENCE TO RELATED APPLICATION

This application claims priority to Chinese Patent Application No. 202010479965.9, filed on May 29, 2020, which is hereby incorporated by reference in its entirety.

TECHNICAL FIELD

The application relates to the technical field of computers, in particular to the field of cloud computing.

BACKGROUND

With the development of micro-service technology, the robustness and fault tolerance of the system are greatly improved, and more and more users can be carried. However, according to incomplete statistics, the fault tolerance of the program itself and the faults caused by unexpected code defects account for more than 50% of all faults.

SUMMARY

A fault injection method and apparatus, an electronic device and a storage medium are provided according to embodiments of the application.

In one aspect, a fault injection method is provided according to an embodiment of the application, the method including:

acquiring a fault injection task, which includes at least one target service identification and a fault scenario corresponding to the target service identification;

determining a target service according to each target service identification, and acquiring a state of the target service; and injecting the fault scenario corresponding to the target service identification into the target service in a case that the state of the target service is a normal state.

In another aspect, a fault injection apparatus is provided according to an embodiment of the application, the apparatus including:

a first acquisition module configured for acquiring a fault injection task, which includes at least one target service identification and a fault scenario corresponding to the target service identification;

a second acquisition module configured for determining a target service according to each target service identification, and acquiring a state of the target service; and an injection module configured for injecting the fault scenario corresponding to the target service identification into the target service in a case that the state of the target service is a normal state.

It is to be understood that the description in this section is not intended to identify key or critical features of the embodiments of the present application, nor is it intended to limit the scope of the application. Other features of the present application will become readily apparent from the following description.

BRIEF DESCRIPTION OF THE DRAWINGS

The drawings are included to provide a better understanding of the embodiments and are not to be construed as limiting the application, wherein.

DETAILED DESCRIPTION

The following describes exemplary embodiments of the present application in conjunction with the accompanying drawings, which include various details of the embodiments of the present application to facilitate understanding, and should be considered as merely exemplary. Accordingly, one of ordinary skill in the art appreciates that various changes and modifications can be made to the embodiments described herein without departing from the scope and spirit of the present application. Also, descriptions of well-known functions and structures are omitted from the following description for clarity and conciseness.

Figure 1:
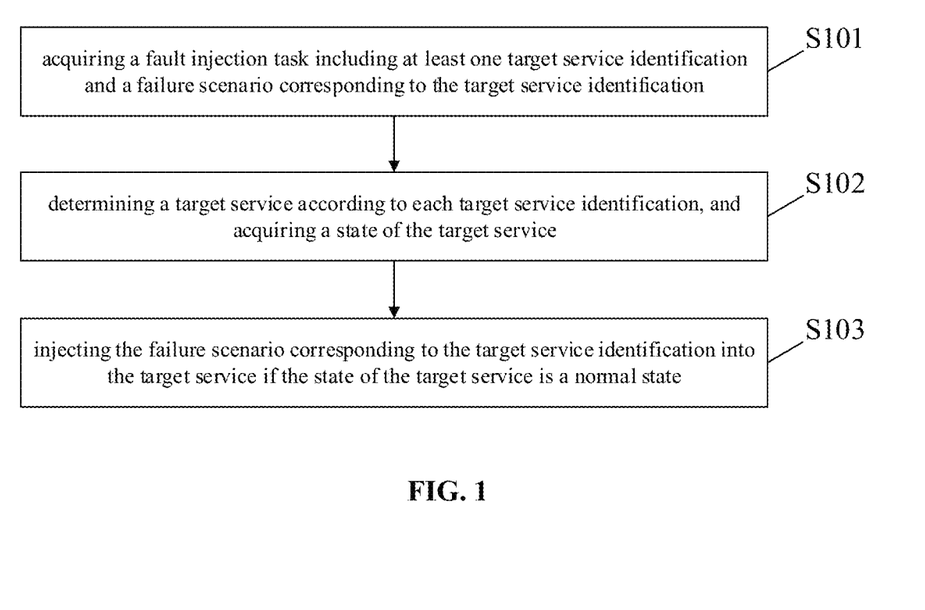
FIG. 1 is a flowchart I of a fault injection method according to an embodiment of the present application.

A fault injection method is provided according to an embodiment of the present application, which can be applied to fault drilling aiming at a micro service architecture. Referring to FIG. 1, a flowchart of the fault injection method is shown, and the method includes:

S101, acquiring a fault injection task, which includes at least one target service identification and a fault scenario corresponding to the target service identification;

S102, determining a target service according to each target service identification, and acquiring a state of the target service; and S103, injecting the fault scenario corresponding to the target service identification into the target service in a case that the state of the target service is a normal state.

According to the embodiment, at least one fault scenario is configured in the fault injection task, the fault injection task is started, so that the fault can be injected into the target service in a case that the state of the target service is normal, which reduces the labor cost of manual input and injection of the fault scenario by an engineer, and avoids the manual input error of the fault injection command; meanwhile, the fault is injected only when the service state is normal, which facilitate guaranteeing the normal operation of fault injection.

In an embodiment, S102 includes: in a case that the fault injection task gets approved, determining the target service according to the target service identification, and acquiring the state of the target service, wherein determining that the fault injection task gets approved includes at least one of:

in a case that at least one of risks of a command and a code segment in the fault scenario in the fault injection task is lower than a preset risk level, determining that the fault injection task gets approved; and in a case of receiving an approval instruction for the fault injection task, determining that the fault injection task gets approved.

In the embodiment, the fault injection task can be executed only after getting approved, which reduces the risk of the fault injection, and reduces the risk of unexpected results of an on-line real environment. Furthermore, the above-described embodiments provide a system approval and a manual approval, for example, a command and a code segment in the fault scenario are reviewed by a system, and get approved if there is no high-risk command or high-risk code; while they need to be re-reviewed manually if there are a high-risk command and a high-risk code, and get approved when an approval instruction for the fault injection is received. Therefore, the fault injection task can be better reviewed, which reduces the risk of fault injection.

Figure 2:
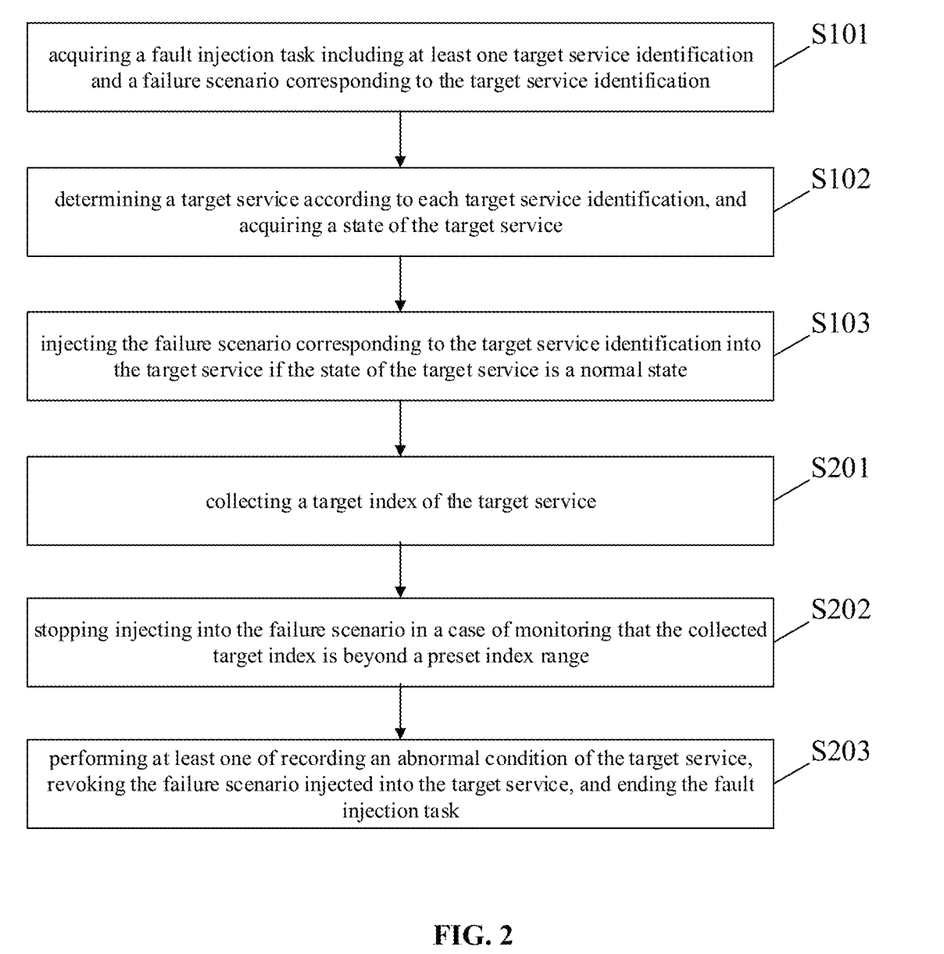
FIG. 2 is a flowchart II of a fault injection method according to an embodiment of the present application.

In an embodiment, referring to FIG. 2, the method further includes:

S201, collecting a target index of the target service; and

S202, stopping injecting into the fault scenario in a case of monitoring that the collected target index is beyond a preset index range According to the embodiment, in the fault injection process, the target index of the target service can be collected automatically, and the fault injection is stopped when the target index is abnormal. The fault drilling can be stopped automatically and quickly when unexpected results occur in the fault drilling process, to avoid more serious faults of the target service, thereby reducing the risk of fault drilling in the real environment on the line.

In an embodiment, a target index of the target service is collected by at least one of collection modes as follows:

acquiring the target index of the target service from a designated index data push interface; and collecting the target index from the target service.

According to the first collection mode, a designated index data push interface is provided, so that an operation and maintenance engineer of the service can automatically push the collected data to the module through a program, to realize the collection and recording of the target index of the service. According to the second collection mode, an operation and maintenance collection program uploaded by an operation and maintenance engineer can be received, and the operation and maintenance collection program is executed in the target service to collect the target index.

According to the embodiment, two modes for collecting the target index of the target service are provided, thereby realizing the automatic collection of the target index of the target service, and reducing the labor cost.

As an example, the target index may be a core index of the target service. As an example, the storage service may include a plurality of indexes such as readability, writability, read speed, and write speed. The core performance of the storage service lies in the abilities to read and write, so readability and writability are the core indexes. It has the following benefit that fault injection into the service may affect a variety of indexes of the service, but the fault injection is to test whether the service will fail, which focuses primarily on the service core performance. Therefore, the core index is collected and monitored, and the simplification of data collection can be improved when the fault test requirement on the service is met.

In an embodiment, referring to FIG. 2, the method further includes:

S203, performing at least one of recording an abnormal condition of the target service, revoking the fault scenario injected into the target service, and ending the fault injection task.

According to the embodiment, after the fault injection is stopped, the abnormal condition of the target service can be automatically recorded to complete the fault test; meanwhile the fault scenario injected into the target service is revoked to avoid the influence of the injected fault on the target service.

Optionally, the abnormal condition of the target service may include: an unexpected failure condition and a target index of the target service.

Optionally, revoking the fault scenario injected into the target service includes: rolling back the target service, to restore the target service to a state before injecting the fault scenario.

Figure 3:
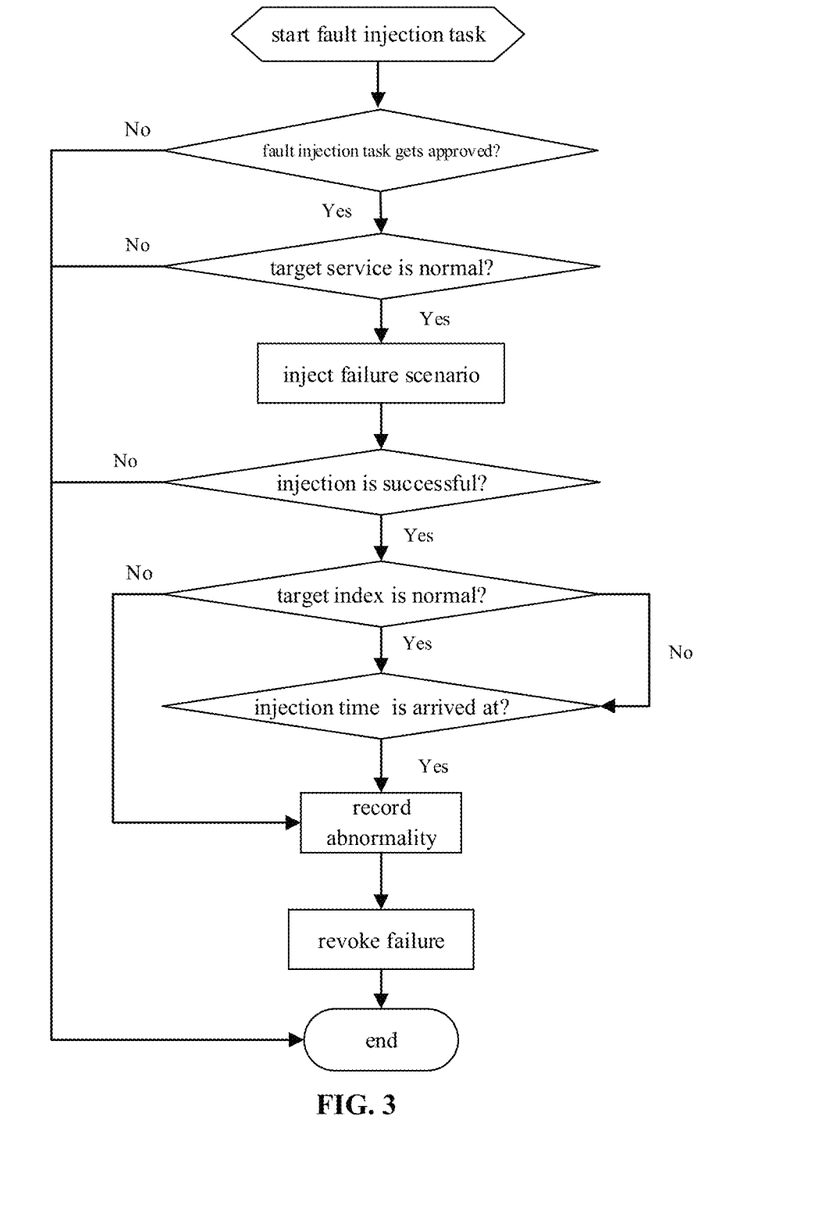
FIG. 3 is a flowchart III of a fault injection method according to an embodiment of the present application.

Referring to FIG. 3, an exemplary flowchart of a specific implementation of the present embodiment is shown. After the state of the target service is checked in S101, the method further includes: in a case that the state of the target service is abnormal, ending the fault injection task. The abnormal state of the target service indicates that there is a fault. Resolving the fault first and then injecting the fault will facilitate guaranteeing the normal progress of the fault drilling. In other alternatives, an abnormal prompt of the target service state can also be generated to prompt the user to resolve the current service fault, and the fault scenario is injected after the state of the target service is checked to be normal.

With continuing reference to FIG. 3, optionally after S103, the method may further include:

if the fault scenario of the fault injection task is injected successfully, and the target index is not beyond the preset index range within the preset injection time, recording the target index, revoking the fault scenario injected into the target service, and ending the fault injection task; and if the fault scenario of the fault injection task is not injected successfully, ending the fault injection task.

Further, a prompt for unsuccessful injection may also be generated to prompt the problem of unsuccessful manual handling of injection. Alternatively, in the case that the fault scenario injection of the fault injection task is unsuccessful, the fault scenario injection is retried and executed, and the retry count of the fault scenario injection may be set in advance.

In an embodiment, the method further includes: configuring the fault injection task according to a received task configuration instruction, wherein the configuring the fault injection task includes at least one of:

adding a fault scenario into the fault injection task;

deleting, editing the fault scenario or performing an injection sequence adjustment on fault scenarios in the fault injection task; and setting a trigger mode of the fault injection task.

According to the embodiment, the corresponding fault injection task is configured through the configuration function, and the corresponding fault drilling process can be realized when the fault injection task is executed, without any manual operation by a user, so that the labor cost is reduced, and the customization degree is high, to facilitate the possibility of realizing more fault drilling, and thus the disaster tolerance capability and the expected behavior of the program can be verified more preferentially, to improve the stability of the system.

Optionally, the triggering mode of the fault injection task includes: (1) a timing trigger mode, wherein only a fixed time needs to be set by a user, and then a start of the fault injection task is triggered at the fixed time; and (2) a random trigger mode, for example, the system randomly generates a fault injection time at which the start of the fault injection task is triggered.

In an embodiment, adding a fault scenario into the fault injection task includes: selecting at least one fault scenario from a fault management module, to be added into the fault injection task, wherein the fault management module is prestored with a plurality of fault scenarios.

According to the embodiment, the engineer can directly select the corresponding fault scenario from the fault management module when configuring the fault injection task. The operation is simple and not prone to errors.

In an embodiment, wherein the fault scenario in the fault management module is managed by at least one of:

adding, deleting, modifying or checking the fault scenario in the fault management module;

generating a fault scenario according to a program content received from a fault programming interface, and uploading the generated fault scenario to the fault management module, wherein, before the fault scenario is generated, a high-risk command and a high-risk code segment in the received program content are identified, to prompt an injection risk of the fault scenario; and binding the fault scenario in the fault management module with the corresponding target service.

According to the embodiment, a function of managing the fault scenario is provided, including writing the fault scenario program, identifying the high-risk command and the high-risk code segment, adding, deleting, modifying or checking various fault scenarios, and matching services required to be applied, which realizes the effective management of various fault scenarios, and improving the efficiency of test work.

The high-risk command and the high-risk code segment in the received program content are identified to prompt an injection risk of the fault scenario. The identification may be not only applied to the program of the fault scenario written by a user, but also may be applied before the fault scenario is injected, and to the approval stage of the fault injection task, and the like.

An application can realize a fault injection platform through the method according to the embodiment of the application. The fault injection platform may include a service index collection module, a fault management module, a fault injection module and a fault injection task management module.

Figure 4:
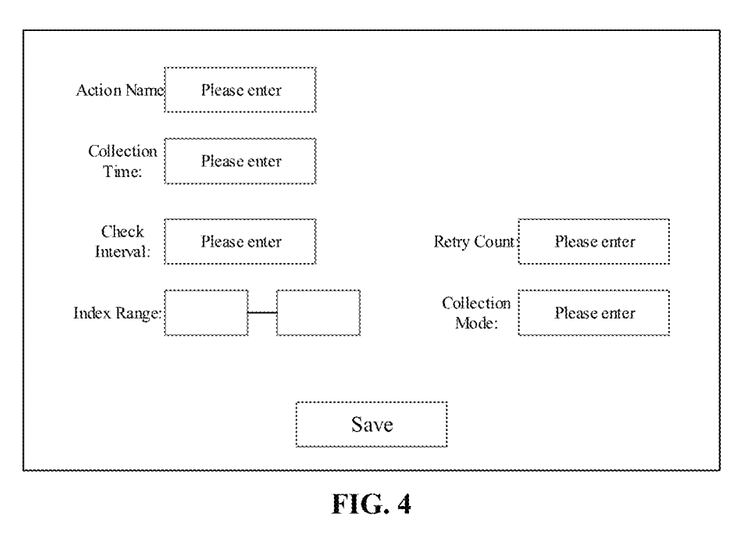
FIG. 4 is an exemplary diagram of an interface of a service index collection module according to an embodiment of the present application.

The service index collection module is configured for providing a function of receiving an input service index collection setting instruction, and generating a corresponding checking action according to the service index collection instruction, wherein the checking action can be used for realizing the state check of the target service in S101, and realizing the target index collection and monitoring of the target service in S103. Referring to FIG. 4, an exemplary interface diagram of a service index collection module is shown. The module provides a user input service index collection setting instruction including at least one setting of an action name, a collection time, a retry count, a collection mode, a check interval, index range, and the like.

Figure 5:
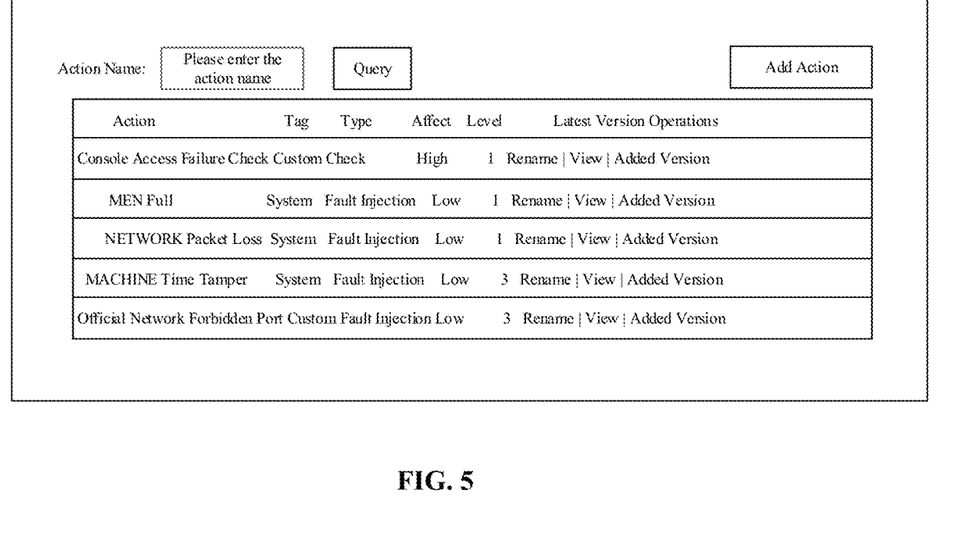
FIG. 5 is an exemplary diagram of an interface of a fault management module according to an embodiment of the present application.

The fault management module is configured for receiving an input fault management instruction and managing the fault scenario according to the fault management instruction, including writing a fault scenario program, identifying a high-risk command and a high-risk code segment, adding, deleting, modifying or checking various fault scenarios, and matching a service required to be applied. Referring to FIG. 5, an exemplary diagram of an interface of a fault management module is shown. The interface shows a portion of the fault scenario (represented by a fault action in the diagram) stored by the fault management module, including information such as an action name, a tag, a type, a latest version, an affecting level, and a manageable operation of the fault scenario. In addition, the fault management module may also provide the management of the checking action with reference to the fault scenario.

A process of performing the fault injection task by the fault injection module is shown in FIG. 3, for example, is not described in detail herein.

The fault injection task management module is configured for realizing the management of fault injection tasks, which includes the view and configuration of each of the fault injection tasks.

Figure 6:
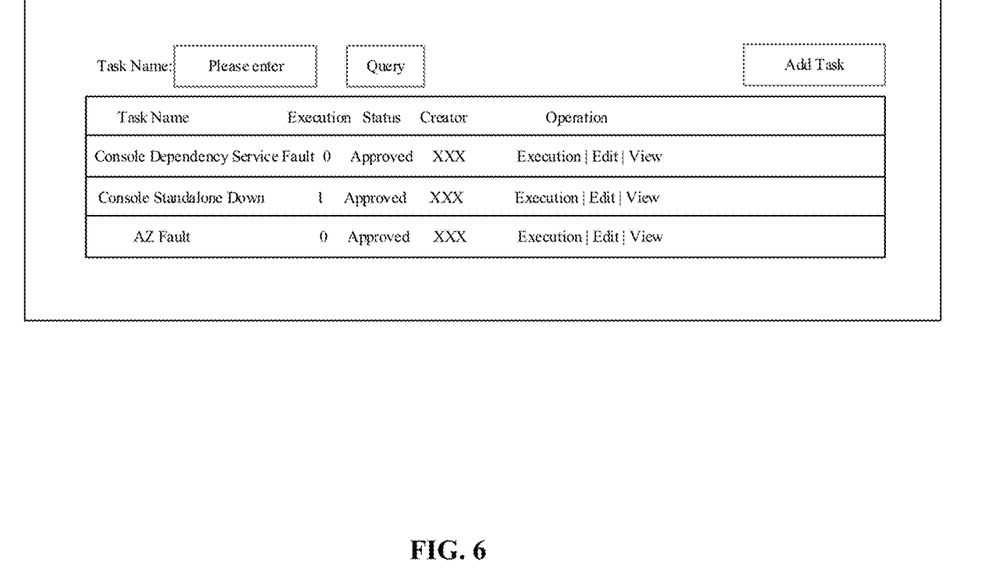
FIG. 6 is an interface diagram I of a fault injection task management module according to an embodiment of the present application.

Referring to FIG. 6, an interface diagram I of a fault injection task management module is shown. The module can display information of a plurality of fault injection tasks such as task names, execution situations, creators and operations.

Figure 7:
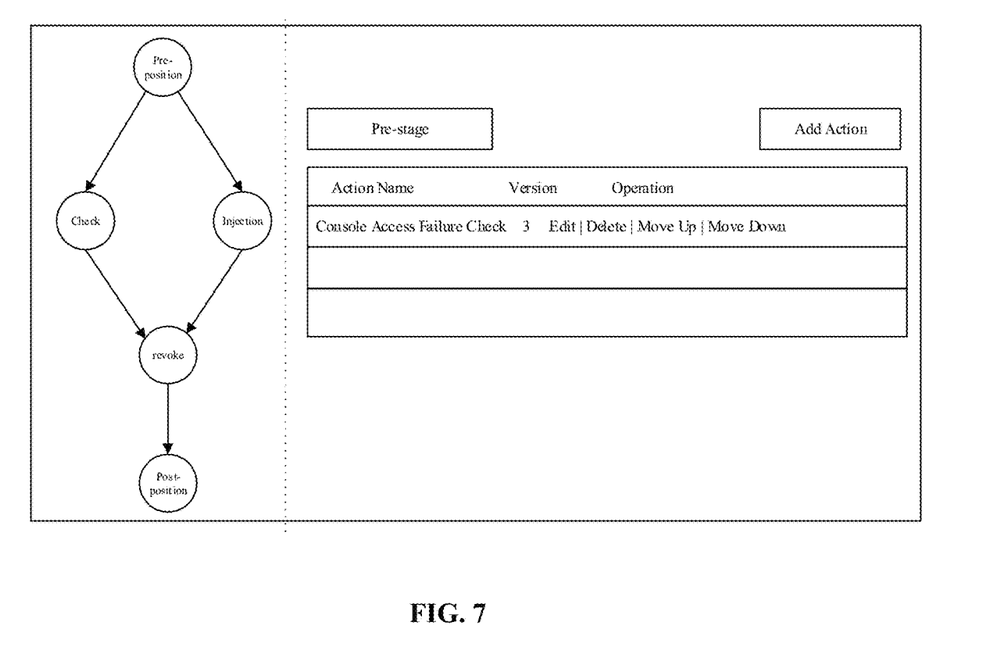
FIG. 7 is an interface diagram II of a fault injection task management module according to an embodiment of the present application.

Referring to FIG. 7, an interface diagram II of a fault injection task management module is shown. Configuring the fault injection task includes configuring the corresponding execution actions for a pre-stage, a checking stage, a revoking stage, and a post-stage, respectively. A checking action is used for the pre-stage to realize the state check of the target service in S101; a checking action is used for the checking stage to realize the target index collection and monitoring of the target service in S103; a fault scenario is configured for the injection stage to realize the fault scenario injection of the target service; and a revoking action is configured for the revoking stage to realize the revocation of the fault scenario injected into the target service.

According to the embodiment of the application, the real disaster tolerance capability and the expected behavior of the program on line can be really verified, thereby improving the stability of the system; meanwhile, the labor input can be reduced in the fault verification process, and great economic benefits are brought.

Figure 8:
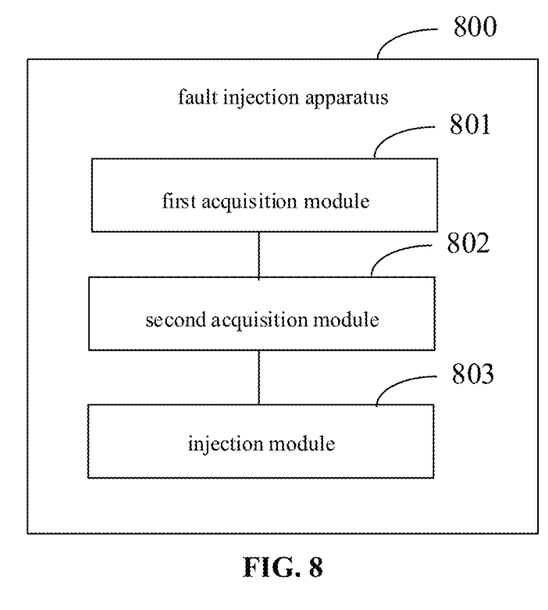
FIG. 8 is a structure diagram I of a fault injection apparatus according to an embodiment of the present application.

Accordingly, referring to FIG. 8, a fault injection apparatus 800 is provided according to an embodiment of the present application, the apparatus including:

a first acquisition module 801 configured for starting a fault injection task to a target service and checking a state of the target service, the fault injection task including at least one fault scenario;

a second acquisition module 802 configured for determining the target service according to each target service identification and acquiring the state of the target service; and an injection module 803 configured for injecting the fault scenario corresponding to the target service identification into the target service if the state of the target service is a normal state.

Figure 9:
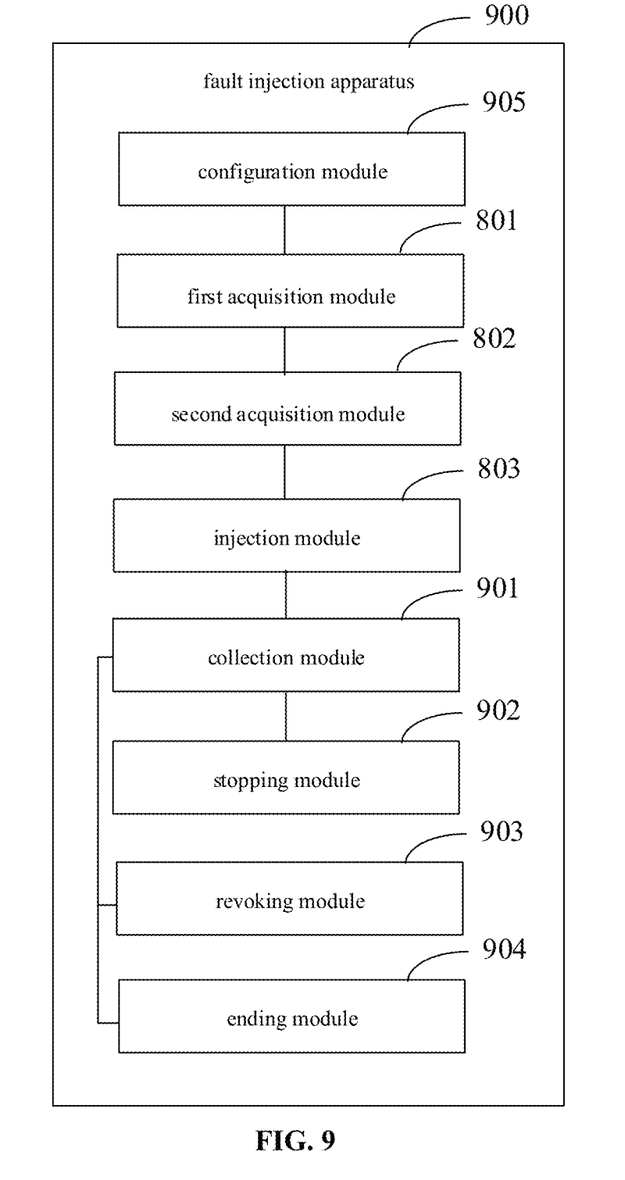
FIG. 9 is a structure diagram II of a fault injection apparatus according to an embodiment of the present application.

In one embodiment, referring to FIG. 9, the apparatus 900 further includes:

a collection module 901 configured for collecting a target index of the target service; and a stopping module 902 configured for stopping injecting into the fault scenario in a case of monitoring that the collected target index is beyond a preset index range.

In one embodiment, the apparatus 900 further includes:

an revoking module 903 configured for revoking the fault scenario injected into the target service; and an ending module 904 configured for ending the fault injection task.

In an embodiment, the second acquisition module 802 is configured for, in a case that the fault injection task gets approved, determining the target service according to the target service identification, and acquiring the state of the target service, wherein determining that the fault injection task gets approved includes at least one of:

in a case that at least one of risks of a command and a code segment in the fault scenario in the fault injection task is lower than a preset risk level, determining that the fault injection task gets approved; and in a case of receiving an approval instruction for the fault injection task, determining that the fault injection task gets approved.

In one embodiment, the apparatus 900 further includes: a configuration module 905 configured for configuring the fault injection task according to a received task configuration instruction.

Figure 10:
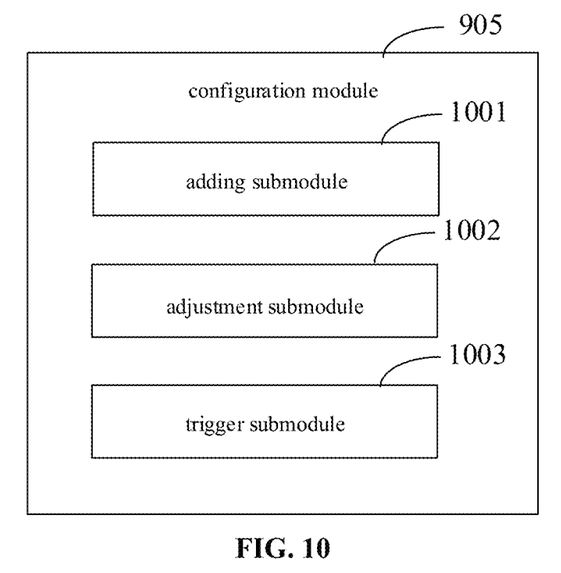
FIG. 10 is a structure diagram III of a fault injection apparatus according to an embodiment of the present application.

Referring to FIG. 10, the configuration module 905 includes:

an adding submodule 1001 configured for adding the fault scenario into the fault injection task;

an adjusting submodule 1002 configured for deleting, editing the fault scenario or performing an injection sequence adjustment on fault scenarios in the fault injection task; and a trigger submodule 1003 configured for setting a triggering mode of the fault injection task.

In an embodiment, the adding submodule is configured for selecting at least one fault scenario from the fault management module, to be added into the fault injection task, wherein the fault management module is pre-stored with a plurality of fault scenarios.

Figure 11:
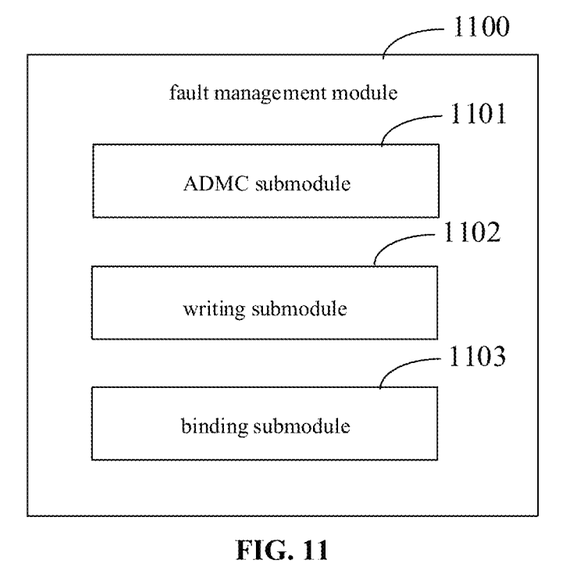
FIG. 11 is a structure diagram IV of a fault injection apparatus according to an embodiment of the present application.

In one embodiment, referring to FIG. 11, a fault management module 1100 includes:

an ADMC (adding, deleting, modifying or checking) submodule 1101 configured for adding, deleting, modifying or checking the fault scenario in the fault management module;

a writing submodule 1102 configured for generating a fault scenario according to a program content received from a fault programming interface, and uploading the generated fault scenario to the fault management module, wherein, before the fault scenario is generated, a high-risk command and a high-risk code segment in the received program content are identified, to prompt an injection risk of the fault scenario; and a binding submodule 1103 configured for binding the fault scene in the fault management module with a corresponding target service.

In one embodiment, the fault injection apparatus 900 may include the fault management module 1100.

Figure 12:
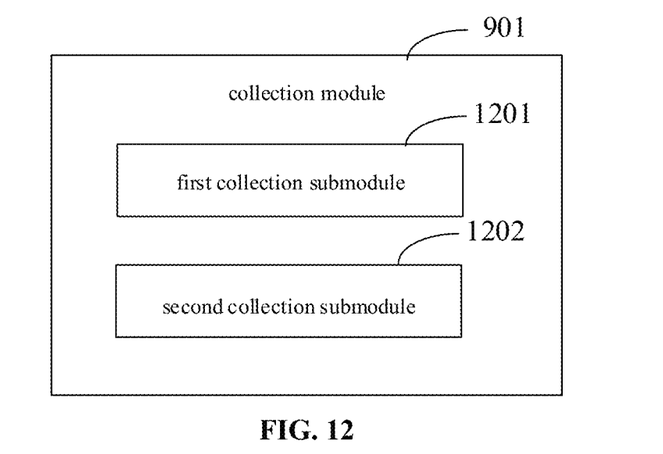
FIG. 12 is a structure diagram V of a fault injection apparatus according to an embodiment of the present application.

In one embodiment, referring to FIG. 12, the collection module 901 includes at least one of:

a first collection submodule 1201 configured for acquiring the target index of the target service from a designated index data push interface; and a second collection submodule 1202 configured for collecting the target index from the target service.

An electronic device and a readable storage medium are also provided according to embodiments of the present application.

Figure 13:
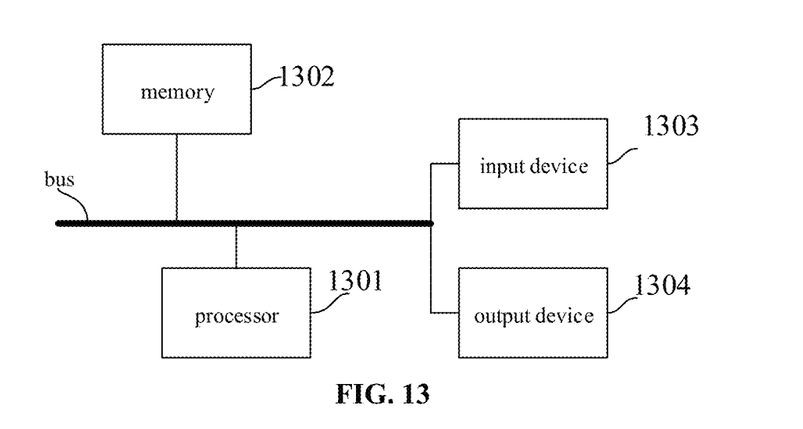
FIG. 13 is a block diagram of an electronic device used to implement a fault injection method according to an embodiment of the present application.

FIG. 13 is a block diagram of an electronic device for a fault injection method according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processing, cellular telephones, smart phones, wearable devices, and other similar computing devices. The components shown herein, their connections and relationships, and their functions are by way of example only and are not intended to limit the implementations of the application described and/or claimed herein.

As shown in FIG. 13, the electronic device includes: one or more processors 1301, memory 1302, and interfaces for connecting components, including a high-speed interface and a low-speed interface. The various components are interconnected using different buses and may be mounted on a common motherboard or otherwise as desired. The processor may process instructions executed in the electronic device, including instructions stored in the memory or on memory to display graphical information of a GUI on an external input/output device, such as a display device coupled to the interface. In other embodiments, a plurality of processors and/or a plurality of buses may be used with a plurality of memories and a plurality of memories, if desired. Also, a plurality of electronic device may be connected, each providing some of the necessary operations (e.g., as an array of servers, a set of blade servers, or a multiprocessor system). One processor 1301 is taken as an example in FIG. 13.

The memory 1302 is a non-transitory computer-readable storage medium provided herein. Wherein the memory stores instructions executable by at least one processor to cause the at least one processor to perform the fault injection method provided herein. The non-transitory computer-readable storage medium of the present application stores computer instructions for causing a computer to perform the fault injection method provided herein.

The memory 1302, as a non-transitory computer-readable storage medium, may be used to store non-transitory software programs, non-transitory computer-executable programs, and modules, e.g. program instructions/modules corresponding to methods for fault injection in embodiments of the present application (such as the first acquisition module 801, the second acquisition module 802, and the injection module 803 shown in FIG. 8). The processor 1301 executes the various functional applications of the server and the data processing, i.e. implement the fault injection method in the above-described method embodiments, by running non-transient software programs, instructions and modules stored in the memory 1302.

The memory 1302 may include a storage program area and a storage data area, wherein the storage program area may store an operating system, an application program required for at least one function; and the storage data area may store data created according to use of the electronic device for the fault injection method, etc. In addition, memory 1302 may include a high-speed random access memory, and may also include a non-transitory memory, such as at least one disk storage device, flash memory device, or other non-transitory solid state storage device. In some embodiments, the memory 1302 optionally includes memories remotely located with respect to the processor 1301, which may be connected via a network to the electronic device for the fault injection method. Examples of such networks include, but are not limited to, the Internet, intranets, local area networks, mobile communication networks, and combinations thereof.

The electronic device for the fault injection method may further include: an input device 1303 and an output device 1304. The processor 1301, the memory 1302, the input device 1303, and the output device 1304 may be connected by a bus or otherwise, as exemplified in FIG. 13 by a bus connection.

The input device 1303 may receive input numeric or character information and generate key signal inputs related to user settings and functional controls of an electronic device, such as touch screens, keypads, mice, track pads, touch pads, pointing sticks, one or more mouse buttons, track balls, joysticks, and other input devices. The output device 1304 may include a display equipment, an auxiliary lighting device (e.g., LED), and a tactile feedback device (e.g., vibration motor), etc. The display equipment may include, but is not limited to, a liquid crystal display (LCD), a light emitting diode (LED) display, and a plasma display. In some embodiments, the display equipment may be a touch screen.

Various embodiments of the systems and techniques described herein may be implemented in digital electronic circuitries, integrated circuit systems, application specific ASICs (application specific integrated circuits), computer hardware, firmware, software, and/or combinations thereof. These various embodiments may include: implementing in one or more computer programs, which can be executed and/or interpreted on a programmable system including at least one programmable processor, which can be a dedicated or general-purpose programmable processor capable of receiving data and instructions from, and transmit data and instructions to, a memory system, at least one input device, and at least one output device.

These computing programs (also referred to as programs, software, software applications, or codes) include machine instructions of programmable processors, and may be implemented using high-level procedural and/or object-oriented programming languages, and/or assembly/machine languages. As used herein, the terms "machine-readable medium" and "computer-readable medium" refer to any computer program product, equipment, and/or device (e.g., magnetic disk, optical disk, memory, programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide interaction with a user, the systems and techniques described herein may be implemented on a computer having: a display device (e.g., a CRT (cathode ray tube) or LCD (liquid crystal display) monitor) for displaying information to the user; and a keyboard and a pointing device (e.g., a mouse or a trackball) through which a user can provide input to the computer. Other types of devices may also be used to provide interaction with the user; for example, the feedback provided to the user may be any form of sensory feedback (e.g., visual feedback, auditory feedback, or tactile feedback); and input from the user may be received in any form (including acoustic input, voice input, or tactile input).

The systems and techniques described herein may be implemented in a computing system that includes a background component (e.g., as a data server), or a computing system that includes a middleware component (e.g., an application server), or a computing system that includes a front-end component (e.g., a user computer having a graphical user interface or a web browser through which the user may interact with embodiments of the systems and techniques described herein), or in a computing system that includes any combination of such background component, middleware component, or front-end component. The components of the system may be interconnected by any form or medium of digital data communication (e.g., a communication network). Examples of communication networks include: Local Area Networks (LANs), Wide Area Networks (WANs), and the Internet.

The computer system may include a client and a server. The client and server are typically remote from each other and typically interact through the communication network. The relationship between the client and the server is generated by computer programs running on the corresponding computers and having a client-server relationship with each other.

According to the technical solutions of the application, the real disaster tolerance capability and the expected behavior of the program on line can be really verified, thereby improving the stability of the system; meanwhile, the labor input can be reduced in the fault verification process, and great economic benefits are brought.

It will be appreciated that the various forms of flows, reordering, adding or removing steps shown above may be used. For example, the steps recited in the present application may be performed in parallel, sequentially or may be performed in a different order, so long as the desired results of the technical solutions disclosed in the present application can be achieved, and no limitation is made herein.

The above-described embodiments are not to be construed as limiting the scope of the present application. It will be apparent to those skilled in the art that various modifications, combinations, sub-combinations and substitutions are possible, depending on design requirements and other factors. Any modifications, equivalent substitutions and improvements made within the spirit and principles of the present application shall be included in the scope of the present application.

What is claimed is:
1. A fault injection method, comprising:
acquiring a fault injection task, which comprises at least one target service identification and a fault scenario corresponding to the target service identification;
determining a target service according to each target service identification, and acquiring a state of the target service; and injecting the fault scenario corresponding to the target service identification into the target service in a case that the state of the target service is a normal state;
wherein the method further comprises:
collecting a target index of the target service; and
stopping injecting the fault scenario in a case of monitoring that the collected target index is beyond a preset index range;
wherein the collecting the target index of the target service comprises at least one of:
acquiring the target index of the target service from a designated index data push interface; and
collecting the target index from the target service.

2. The method of claim 1, further comprising at least one of:
revoking the fault scenario injected into the target service; and
ending the fault injection task.

3. The method of claim 1, wherein the determining the target service according to each target service identification, and acquiring the state of the target service, comprises: in a case that the fault injection task gets approved, determining the target service according to the target service identification, and acquiring the state of the target service,
wherein determining that the fault injection task gets approved comprises at least one of:
in a case that at least one of risks of a command and a code segment in the fault scenario in the fault injection task is lower than a preset risk level, determining that the fault injection task gets approved; and
in a case of receiving an approval instruction for the fault injection task, determining that the fault injection task gets approved.

4. The method of claim 1, further comprising: configuring the fault injection task according to a received task configuration instruction,
wherein the configuring the fault injection task comprises at least one of:
adding the fault scenario into the fault injection task;
deleting, editing the fault scenario or performing an injection sequence adjustment on fault scenarios in the fault injection task; and
setting a triggering mode of the fault injection task.

5. The method of claim 4, wherein the adding the fault scenario into the fault injection task comprises: selecting at least one fault scenario from a fault management module, to be added into the fault injection task, wherein the fault management module is prestored with a plurality of fault scenarios.

6. The method of claim 5, wherein the fault scenario in the fault management module is managed by at least one of:
adding, deleting, modifying or checking the fault scenario in the fault management module;
generating a fault scenario according to a program content received from a fault programming interface, and uploading the generated fault scenario to the fault management module, wherein, before the generating the fault scenario, a high-risk command and a high-risk code segment in the received program content are identified, to prompt an injection risk of the fault scenario; and
binding the fault scenario in the fault management module with a corresponding target service.

7. A fault injection apparatus, comprising:
at least one processor; and
a memory communicatively connected with the at least one processor, wherein
the memory stores instructions executable by the at least one processor, and the instructions, when executed by the at least one processor, enable the at least one processor to perform operations comprising:
acquiring a fault injection task, which comprises at least one target service identification and a fault scenario corresponding to the target service identification;
determining a target service according to each target service identification, and acquiring a state of the target service; and
injecting the fault scenario corresponding to the target service identification into the target service in a case that the state of the target service is a normal state;
wherein the operations further comprise:
collecting a target index of the target service; and
stopping injecting into the fault scenario in a case of monitoring that the collected target index is beyond a preset index range;
wherein the collecting the target index of the target service comprises at least one of:
acquiring the target index of the target service from a designated index data push interface; and
collecting the target index from the target service.

8. The apparatus of claim 7, wherein the operations further comprise:
revoking the fault scenario injected into the target service; and
ending the fault injection task.

9. The apparatus of claim 7, wherein the determining the target service according to each target service identification, and acquiring the state of the target service, comprises: in a case that the fault injection task gets approved, determining the target service according to the target service identification, and acquiring the state of the target service,
wherein determining that the fault injection task gets approved comprises at least one of:
in a case that at least one of risks of a command and a code segment in the fault scenario in the fault injection task is lower than a preset risk level, determining that the fault injection task gets approved; and
in a case of receiving an approval instruction for the fault injection task, determining that the fault injection task gets approved.

10. The apparatus of claim 7, wherein the operations further comprises: configuring the fault injection task according to a received task configuration instruction,
wherein the configuring the fault injection task comprises at least one of:
adding the fault scenario into the fault injection task;
deleting, editing the fault scenario or performing an injection sequence adjustment on fault scenarios in the fault injection task; and
setting a triggering mode of the fault injection task.

11. The apparatus of claim 10, wherein the adding the fault scenario into the fault injection task comprises: selecting at least one fault scenario from a fault management module, to be added into the fault injection task, wherein the fault management module is pre-stored with a plurality of fault scenarios.

12. The apparatus of claim 11, wherein the fault scenario in the fault management module is managed by at least one of:
adding, deleting, modifying or checking the fault scenario in the fault management module;
generating a fault scenario according to a program content received from a fault programming interface, and uploading the generated fault scenario to the fault management module, wherein, before the fault scenario is generated, a high-risk command and a high-risk code segment in the received program content are identified, to prompt an injection risk of the fault scenario; and
binding the fault scenario in the fault management module with a corresponding target service.

13. A non-transitory computer-readable storage medium storing computer instructions, wherein the computer instructions cause a computer to perform operations comprising:
acquiring a fault injection task, which comprises at least one target service identification and a fault scenario corresponding to the target service identification;
determining a target service according to each target service identification, and acquiring a state of the target service; and
injecting the fault scenario corresponding to the target service identification into the target service in a case that the state of the target service is a normal state;
wherein the operations further comprise:
collecting a target index of the target service; and
stopping injecting the fault scenario in a case of monitoring that the collected target index is beyond a preset index range;
wherein the collecting the target index of the target service comprises at least one of:
acquiring the target index of the target service from a designated index data push interface; and
collecting the target index from the target service.

14. The storage medium of claim 13, wherein the operations further comprise at least one of:
revoking the fault scenario injected into the target service; and
ending the fault injection task.

15. The storage medium of claim 13, wherein the determining the target service according to each target service identification, and acquiring the state of the target service, comprises: in a case that the fault injection task gets approved, determining the target service according to the target service identification, and acquiring the state of the target service,
wherein determining that the fault injection task gets approved comprises at least one of:
in a case that at least one of risks of a command and a code segment in the fault scenario in the fault injection task is lower than a preset risk level, determining that the fault injection task gets approved; and
in a case of receiving an approval instruction for the fault injection task, determining that the fault injection task gets approved.

* * * * *